(12) United States Patent
Kahle

(10) Patent No.: US 8,677,833 B2
(45) Date of Patent: Mar. 25, 2014

(54) MASS FLOW MEASUREMENT AND MEASURING APPARATUS HAVING A CENTRAL BULK MATERIAL FEED

(75) Inventor: Jens Kahle, Dreieich (DE)

(73) Assignee: Schenck Process GmbH (DE)

( * ) Notice: Subject to any disclaimer, the term of this patent is extended or adjusted under 35 U.S.C. 154(b) by 241 days.

(21) Appl. No.: 13/376,500

(22) PCT Filed: Jul. 7, 2010

(86) PCT No.: PCT/EP2010/004088
§ 371 (c)(1),
(2), (4) Date: Jan. 17, 2012

(87) PCT Pub. No.: WO2011/003582
PCT Pub. Date: Jan. 13, 2011

(65) Prior Publication Data
US 2012/0103110 A1    May 3, 2012

(30) Foreign Application Priority Data
Jul. 7, 2009 (DE) .......................... 10 2009 032 145

(51) Int. Cl.
*G01F 1/30* (2006.01)
(52) U.S. Cl.
USPC .................................. 73/861.73
(58) Field of Classification Search
USPC ............... 73/861.73, 861.71, 861.72, 861.74
See application file for complete search history.

(56) References Cited

U.S. PATENT DOCUMENTS

| 2,934,951 | A | 5/1960 | Tzu |
| 4,077,541 | A | 3/1978 | Murray |
| 4,122,715 | A * | 10/1978 | Yokoyama et al. ........ 73/861.73 |
| 5,681,999 | A * | 10/1997 | Pollano et al. ............. 73/861.73 |
| 6,651,516 | B2 * | 11/2003 | Soderholm et al. ........ 73/861.73 |
| 8,176,797 | B2 * | 5/2012 | Henry et al. ............... 73/861.73 |

FOREIGN PATENT DOCUMENTS

| DE | 1958947 B2 | 4/1971 |
| DE | 19835555 A1 | 2/2000 |
| DE | 102004060045 A1 | 7/2006 |
| EP | 0590187 B1 | 4/1994 |
| EP | 0845662 A1 | 6/1998 |
| EP | 0864850 A1 | 9/1998 |

OTHER PUBLICATIONS

"International Search Report and Written Opinion for Intl Application No. PCT/EP2010/004088", Nov. 15, 2010, Publisher: EPO, Published in: EP.
Stade, Dr., "DE Application No. 10 2009 032 145.4 Office Action Feb. 9, 2010" Publisher: DPMA, Published in: DE.
Wittmann-Regis, Agnes, "PCT Application No. PCT/EP2010/004088 International Preliminary Report on Patentability Jan. 26, 2012", , Publisher: PCT, Published in: PCT.

\* cited by examiner

*Primary Examiner* — Jewel V Thompson
(74) *Attorney, Agent, or Firm* — Kaplan Breyer Schwarz & Ottesen, LLP

(57) ABSTRACT

The present invention relates to a method and an apparatus for measuring a mass flow of flowable bulk materials according to the Coriolis principle of measurement. The apparatus comprises a vane wheel by which a mass flow that is supplied in axial direction can be radially redirected and by which it is possible to detect the drive torque that that necessary to achieve the redirection. A drive shaft that is routed through the top side of the housing is configured as a hollow shaft through which the bulk material can be fed to the vane wheel in vertical direction toward the center of its axis of rotation.

11 Claims, 1 Drawing Sheet

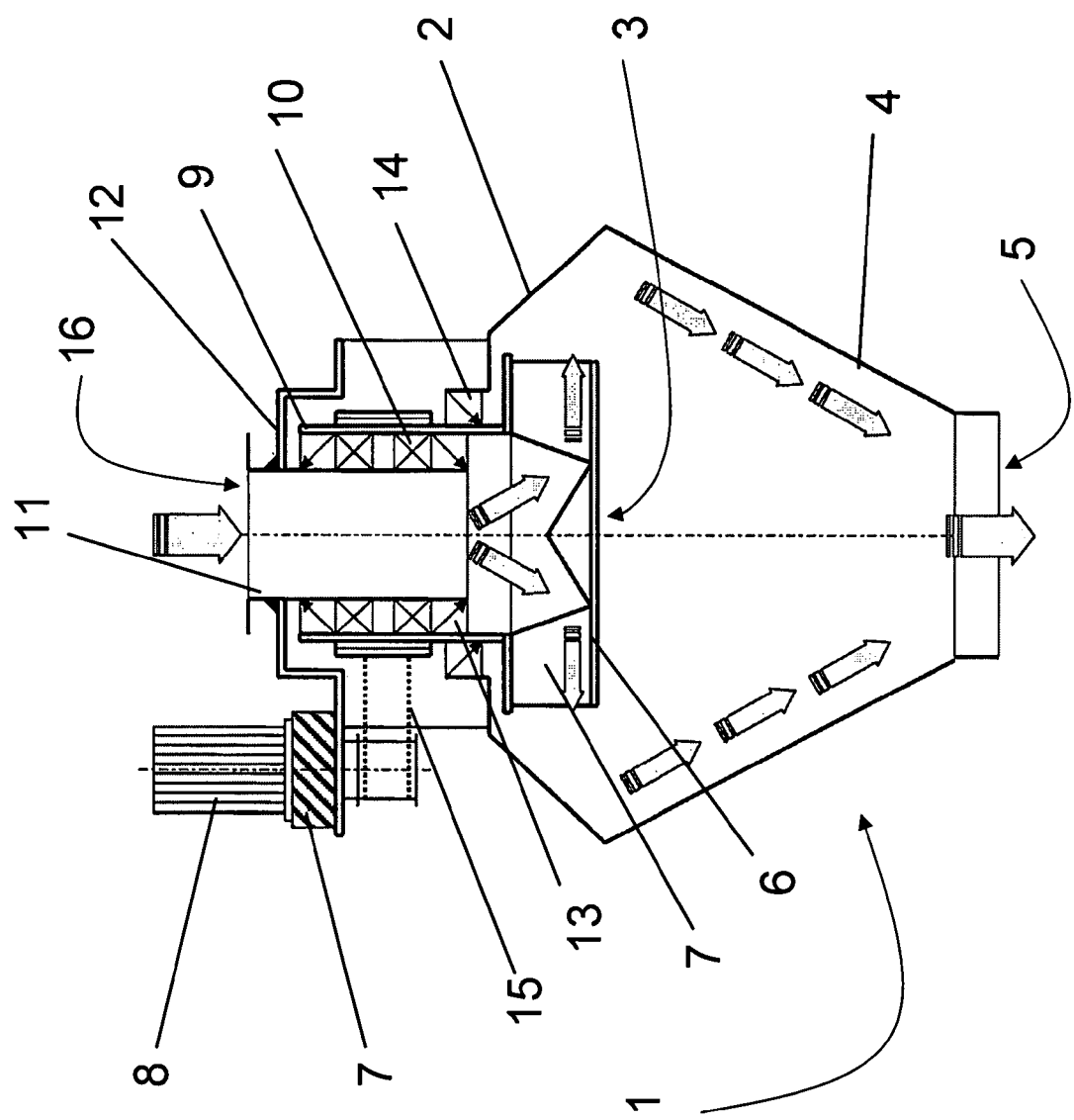

MASS FLOW MEASUREMENT AND MEASURING APPARATUS HAVING A CENTRAL BULK MATERIAL FEED

FIELD OF THE INVENTION

The present invention relates to an apparatus for measuring a mass flow of flowable bulk materials according to the Coriolis principle of measurement.

BACKGROUND OF THE INVENTION

Measuring instruments for the continuous detection, dosage and adjustment of large quantities of flowable bulk materials that can be used to measure a given flowing mass flow, which take advantage of the Coriolis force, are known in the art. A measuring instrument of this kind will be designated below as a Coriolis measuring instrument and is known to the person skilled in the art, for example, also as a Coriolis flow-through scale or Coriolis scale. Coriolis measuring instruments essentially consist of a housing comprising an inlet tube, an outlet cone and a vane wheel that is able to rotate around a vertical axis of rotation. The vane wheel has a drive shaft that is preferably centrally routed through the top side of the housing and connected to a drive that is disposed outside of the housing.

The mass flow of a given bulk material that is to be detected is directed through the inlet tube toward the middle of the vane wheel, which rotates around the drive axis at a constant speed. The vane wheel has vanes that are disposed in a star-shaped manner around its axis of rotation and by which the inflowing bulk material is accelerated toward the outside. The Coriolis acceleration, upon which the movement of the mass particles is based, results in a momentum that acts on the vane wheel and that is proportionate to the mass flow of the bulk material flowing over the vane wheel. The Coriolis force acts counter to the torque that is provided by the drive of the measuring instrument and that is transferred via the drive shaft to the vanes; it can be detected by a torque measuring instrument that is disposed between drive and drive shaft.

EP 0 590 187 B1 discloses, for example, an embodiment of a mass flow measuring instrument that has the drive unit disposed above a rotating vane wheel. The drive shaft of the vane wheel is therefore aligned upward and routed through the top side of the housing of the apparatus. Consequently, the given bulk material must be fed from above through the inlet tube and at an angle around the drive shaft, then re-directed in a vertical direction shortly before entering the vane wheel. This angular feed of the bulk material has a disadvantageous effect on the accuracy of the measuring action of the device. Moreover, it is possible for foreign objects to get caught on the directional changeovers, which are necessary, thus blocking the bulk material feed.

An alternative embodiment of a Coriolis measuring instrument having an associated drive that is disposed below the vane wheel is known, for example, from DE 102 53 078 B3. The advantageous aspect of such embodiments operating according to the Coriolis principle is that the drive shaft does not have to be routed through the inflowing bulk material flow, which allows for directing the bulk material vertically from above and directly into the middle of the respective vane wheel, thus eliminating the need of having to redirect the flow immediately before the feed action. This vertical feed of the bulk material is advantageous for the accuracy of the measurement; and the bulk material is then discharged at a downward angle passing by the drive that is disposed in the center.

A similar embodiment with a drive shaft that is disposed below the vane wheel and with a central vertical bulk material feed is disclosed in DE 10 2004 060 045 B4; the drive herein is disposed laterally adjacent to the housing. The power transmission from the drive to the drive shaft and/or the vane wheel is achieved via a toothed belt or a spur gear pair located inside an encapsulated housing inside the bulk material chamber of the Coriolis measuring device. The bulk material is discharged centrally below the power transmission.

It is disadvantageous on these known embodiments that the drive is located at least in part inside the bulk material chamber thus impeding the bulk material discharge into the outlet cone of the measuring device. Furthermore, the affected drive components that are disposed inside the bulk material chamber are directly exposed to temperature stresses by the bulk material.

The known embodiments of Coriolis measuring instruments suffer considerably from a propensity of being subject to blockages, especially when the volume flows are small, due to the smaller inlet cross-sections and the smaller housing dimensions. But problems due to obstructions are also known from the conveyance of difficult bulk materials.

SUMMARY OF THE INVENTION

In consideration of this technical background the present invention seeks to provide a new concept for a Coriolis measuring instrument that combines the advantages of a central, vertical bulk material feed to the vane wheel with a central bulk material discharge and a drive-engineering solution that is disposed on the outside and without interfering components inside the bulk material flow.

Correspondingly, the invention proposes a method for measuring a mass flow of flowable bulk materials according to the Coriolis principle of measurement wherein a vane wheel, which is disposed below a vertically disposed hollow shaft, is powered by the hollow shaft, and the bulk material is fed vertically from above through the hollow shaft.

In an expedient embodiment the hollow shaft herein is powered by a laterally disposed drive located above the vane wheel and outside a bulk material chamber that is reserved for the bulk material, in particular by a toothed belt, a chain drive or a spur gear pair.

An apparatus according to the invention for measuring a mass flow of flowable bulk materials according to the Coriolis principle of measurement extends essentially rotationally symmetric around a center axis and comprises a vane wheel that is powered by a drive running at a constant speed and by which a mass flow that is applied in axial direction can be radially redirected. The drive torque that is necessary for the redirection can be detected by a torque measuring device. The vane wheel is fastened inside a stationary housing below a rotably supported drive shaft that is routed in vertical alignment through the top side of the housing and connected with the drive. An outlet cone is disposed below the vane wheel that encloses a bulk material chamber with the housing and comprises at the bottom end a discharge opening.

According to the invention the drive shaft is configured as a hollow shaft that is open on both sides; it is aligned by its first opening with a feed opening and opens up to the vane wheel by its second opening.

The invention therefore allows for a mass flow of a flowable bulk material, which is to be measured, to be fed to the vane wheel in a vertical direction and in the center of said vane wheel's rotational axis and without having to route said flow around a drive shaft, which is routed upward and out of the housing.

Preferably, the drive shaft, which is configured as a hollow shaft, is supported with the ability to rotate around a mounting flange that is statically connected with the stationary housing. The mounting flange comprises essentially a hollow cylinder that extends centrically around and along the center axis of a feed opening to immediately over the vane wheel.

The hollow shaft is preferably supported on the mounting flange by a ball and/or roller bearing. The stationary mounting flange is sealed relative to the rotating hollow shaft by at least one radial shaft seal ring, thus effectively preventing that particles of the bulk material penetrate into the bearing.

The stationary housing of the apparatus is sealed relative to the rotating hollow shaft by a radial shaft seal ring, thus sealing the bulk material chamber from the outside environment.

The drive of the apparatus includes a drive motor that is disposed laterally adjacent to the rotating hollow shaft and statically connected with the stationary housing. The force transmission between the drive motor and the hollow shaft occurs via a force transmission device constituted preferably of a toothed belt drive, a chain drive or a spur gear pair.

The inlet and outlet openings are centrically aligned, respectively, relative to the center axis of the apparatus.

The especially advantageous aspect of the subject-matter of the present invention is that there are no static and/or movable parts whatsoever located inside the feed of the bulk material to the vane wheel as well as inside the bulk material chamber below the vane wheel that could interfere with the bulk material flow. Moreover, the drive of the drive motor, the torque measuring instrument and the power transmission device of the drive shaft are disposed, thermally beneficially, outside of the bulk material chamber.

BRIEF DESCRIPTION OF THE DRAWINGS

The present characteristics as well as further characterizing features and the associated advantages of the invention are illustrated in further detail in one subsequent embodied example in reference to the enclosed drawing.

FIG. 1 A schematic cross-section of an apparatus for measuring a mass flow of flowable bulk materials according to the Coriolis principle of measurement

DETAILED DESCRIPTION

The FIGURE contains a sketch of an apparatus according to the invention for measuring a mass flow of bulk materials according to the invention. The marked perforated line identifies the central axis of a measuring apparatus 1 that is shown by way of a cross-section. Practically, apparatus 1 is structured essentially rotationally symmetric relative to the central axis.

The sketched Coriolis measuring apparatus 1 comprises an outer housing 2 inside which a vane wheel 3 is rotably supported. An outlet cone 4 is disposed below vane wheel 3 that is attached to the housing 2, and wherein housing 2 and outlet cone 4 constitute in conjunction an outer housing, for example the entire housing of the apparatus; they may, if necessary, be configured as a one-piece component. The outlet cone 4 reduces the diameter of housing 2 to the size of a discharge opening 5. The discharge opening 5 is disposed centrically relative to the mid-perpendicular of the measuring apparatus. Envisioned at the discharge opening 5 is a possibility for connecting a conveying means that is not shown in the FIGURE; for example, said means can be configured as a pipe.

The vane wheel 3 is configured as rotationally symmetric having a horizontally disposed vane wheel disc 6 that is powered rotating around a vertical center axis. The axis of rotation of the vane wheel 3 runs through the center axis of the Coriolis measuring apparatus 1. A number of wings 7 are located on the top side of the disc 6 disposed in a star-shaped manner around the axis of rotation of the vane wheel 3.

The drive action for the vane wheel 3 is provided via the top side of the bulk material chamber, as demonstrated by the housing 2 and the outlet cone 4. Said drive comprises essentially a torque measuring device 7 and a drive motor 8 by which a drive shaft, which is connected with the vane wheel 3, is powered. The Coriolis force acting upon the vane wheel 3 is detected by the torque measuring device 7 that is disposed in the drive.

The drive shaft of the vane wheel 3 is configured as a hollow shaft 9 that is expediently supported, rotating via at least one bearing 10, around a stationary mounting flange 11. A bearing of this kind 10 can be configured, for example, as a ball or roller bearing. The mounting flange 11 is statically connected with the housing 2 and comprises essentially a hollow cylinder. Said cylinder extends along the center axis from the top side of the apparatus 1 to the vane wheel 3; it is supported, for example, by a further housing or a support device of housing 2 and is subsequently also referred to as drive housing 12. The drive shaft 9 is thus disposed outside of the bulk material chamber of the Coriolis measuring apparatus.

The stationary mounting flange 11 is sealed toward the hollow shaft 9 that is rotably supported thereupon by way of radial shaft seal rings 13 in order to prevent bulk material and other dust-type particles from penetrating the bearing 10. A further radial shaft seal ring 14 is disposed between vane wheel 3 and housing 2 in order to seal the bulk material chamber against the outside environment of the apparatus.

The drive motor 8 is located above vane wheel 3 and disposed laterally relative to the hollow shaft 9 as well as outside of the bulk material chamber; it is connected via a motor flange with the drive housing. The rotor shaft of the drive motor 8 is thus aligned parallel relative to the axis of rotation of the hollow shaft 9 and extends at a lateral distance relative to the former. The power transmission between drive motor 8 and hollow shaft 9 occurs via a power transmission means 15, which can be configured, for example, as a toothed ring drive and/or chain drive or spur gear pair.

A torque measuring means 7 by which the Coriolis force is to be detected during a measurement is depicted in the FIGURE in an exemplary manner as disposed on the motor flange.

To effect the mass flow measurement a flowable bulk material is fed via the feed opening 16 in the mounting flange 11 of the shown Coriolis measuring instrument 1. The bulk material falls through the cylindrical pipe of the mounting flange 11 that is surrounded by the rotably powered hollowed shaft 9. The bulk material, which is fed centrally along the center axis, is guided via the mounting flange 11 that ends immediately above the vane wheel 3 into the center of vane wheel 3.

The inflowing bulk material particles that follow the vane wheel 3 in a vertical direction make contact with the horizontally aligned vane wheel disc.

The mass particles of the bulk material undergo an angular acceleration by the vanes of the vane wheel 3 that is powered at a constant speed. The necessary force accelerating the mass particles, which is the so-called Coriolis force, acts counter to the torque of the drive and is detected in the torque measurement means 7. The measured torque acting counter the drive is proportionate relative to the mass flow currently flowing over the vane wheel.

The bulk material particles that are accelerated in the vane wheel 3 in the direction of rotation of said vane wheel move in accordance with the centrifugal force in a radial direction exiting the wheel at its outermost edge, in accordance with the previously described apparatus expediently in tangential direction. The bulk material that is thrown off by the vane wheel is captured by housing 2 and, directed by the gravitational force, along the inside wall of the outlet cone 4 downward to the discharge opening 5 of the measuring instrument.

The bulk material flow is indicated by the arrows in the FIGURE. The drawing shows that inlet and outlet are disposed on the center axis of the measuring apparatus. The Coriolis measuring apparatus has a central, vertical bulk material feed and a central bulk material discharge. Particularly due to the externally positioned drive device, the bulk material chamber does not contain any components that may impede the bulk material flow and result in blockages of the apparatus.

The previously described apparatus according to the invention is therefore particularly preferred for the implementation of a method for measuring a mass flow of flowable bulk materials according to the Coriolis principle of measurement providing a vane wheel, which is disposed below a vertically disposed hollow shaft, and the vane wheel is powered via the hollow shaft, and the bulk material is fed vertically from above through the hollow shaft, and wherein the hollow shaft is powered in an expedient configuration above the vane wheel and externally of the bulk material chamber reserved for the bulk material by a laterally disposed drive, in particular by a toothed belt, a chain belt or a spur gear pair.

The invention claimed is:

1. A method for measuring a mass flow of flowable bulk material according to the Coriolis principle of measurement, the method comprising:
   powering, by a vertically-disposed hollow shaft, a vane wheel that is disposed below the hollow shaft; and
   feeding, through the hollow shaft, the bulk material vertically from above.

2. The method according to claim 1, further comprising powering the hollow shaft above the vane wheel and outside of a bulk material chamber that is reserved for the bulk material, by a laterally disposed, external drive.

3. An apparatus for measuring a mass flow of flowable bulk materials according to the Coriolis principle of measurement, the apparatus comprising:
   a rotably supported drive shaft (9) that is routed in vertical alignment through the top side of a stationary housing (2) and connected to a drive; and
   a vane wheel (3), which is powered by the drive and at a constant speed, by which a mass flow that is supplied in axial direction is radially redirectable and detectable with the drive torque that is necessary for the redirection inside a torque measuring means (7), and wherein the vane wheel (3) is fastened inside the housing (2) below the rotably supported drive shaft (9), and wherein an outlet cone (4) is disposed below the vane wheel (3) on the housing (2) that encloses a bulk material chamber in conjunction with the housing and contains a discharge opening (5) at its bottom end;
   wherein the drive shaft (9) is configured as a hollow shaft that is open on both ends and aligned by its first opening with the feed opening (16) and opens up by its second opening to the vane wheel (3) and through which the mass flow that is to be measured can be fed in vertical direction to the vane wheel (3); and
   wherein the apparatus extends essentially rotationally symmetrical around a center axis.

4. The apparatus according to claim 3 wherein the hollow shaft (9) is rotably supported around a mounting flange (11), and wherein the mounting flange (11) is statically connected to the housing (2).

5. The apparatus according to claim 4 wherein the mounting flange (11) essentially comprises a hollow cylinder that extends centrically around and along the center axis of a feed opening (16) to immediately above the vane wheel (3).

6. The apparatus according to claim 4 wherein the hollow shaft (9) is supported by a ball and/or roller bearing (10) on the mounting flange (11).

7. The apparatus according to claim 4 wherein the stationary mounting flange (11) is sealed toward the rotating hollow shaft (9) by at least one radial shaft seal ring (10).

8. The apparatus according to claim 3 wherein the stationary housing (2) is sealed toward the rotating hollow shaft (9) by radial shaft seal ring (14).

9. The apparatus according to claim 3 wherein the drive includes a drive motor (8) that is statically connected laterally and adjacent to the rotating hollow shaft (9) with the stationary housing (2), and wherein the power transmission between the drive motor (8) and the hollow shaft (9) occurs via a power transmission means (15).

10. The apparatus according to claim 9 wherein the power transmission means (15) is a toothed belt drive and/or a chain drive and/or a spur gear pair.

11. The apparatus according to claim 3 wherein the feed opening (16) and the discharge opening (5) are aligned centrically relative to the center axis.

* * * * *

UNITED STATES PATENT AND TRADEMARK OFFICE
CERTIFICATE OF CORRECTION

PATENT NO. : 8,677,833 B2
APPLICATION NO. : 13/376500
DATED : March 25, 2014
INVENTOR(S) : Jens Kahle It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 146 days.

Signed and Sealed this
Twenty-ninth Day of September, 2015

Michelle K. Lee
*Director of the United States Patent and Trademark Office*